United States Patent [19]

Andrei-Alexandru et al.

[11] 4,450,390

[45] May 22, 1984

[54] WINDOW LIFTER AND DOOR LOCKING SYSTEM

[75] Inventors: Marcel Andrei-Alexandru; Hans Prohaska, both of Bietigheim-Bissingen, Fed. Rep. of Germany

[73] Assignee: ITT Industries, Inc., New York, N.Y.

[21] Appl. No.: 369,259

[22] Filed: Apr. 16, 1982

[30] Foreign Application Priority Data

Apr. 28, 1981 [DE] Fed. Rep. of Germany ....... 3116737

[51] Int. Cl.³ ............................................ B60R 25/04

[52] U.S. Cl. .................................... 318/282; 318/468; 318/286; 180/289

[58] Field of Search ............... 318/282, 256, 264, 265, 318/266, 267, 466–469; 180/286, 287, 289; 280/289 L; 200/61.62, 61.64, 61.66; 49/24, 35, 72; 292/201, 198, 199

[56] References Cited

U.S. PATENT DOCUMENTS

| | | | |
|---|---|---|---|
| 3,339,665 | 9/1967 | Johnstone et al. | 180/289 |
| 3,735,833 | 5/1973 | Sutkowski | 180/289 |
| 4,240,516 | 12/1980 | Henderson et al. | 180/289 |

*Primary Examiner*—B. Dobeck
*Assistant Examiner*—Arthur G. Evans
*Attorney, Agent, or Firm*—James B. Raden; William J. Michals

[57] ABSTRACT

A circuit arrangement for a reversible electric motor supplied from a voltage source, which motor drives a combined window-lifter and door-locking installation in motor vehicles. The motor is switched on by way of a first operating switch developed as a reversing switch and by way of a second operating switch serving as a central switch. A position switch is assigned to the motor and is developed as a two-way switch which is operated by the motor. When the window is completely closed, the position switch may be changed over from a first switching position into a second switching position and after an unlocking operation, or before the window is opened, the position switch may again be changed over from the second switching position into the first one. During a locking operation the second input of the position switch is applied to a pole of the voltage source other than the pole used during the other adjusting operations.

8 Claims, 4 Drawing Figures

WINDOW LIFTER AND DOOR LOCKING SYSTEM

BACKGROUND OF THE INVENTION

This invention refers to a circuit arrangement for a reversible electric motor supplied from a voltage source, which motor drives a combined window-lifter and door locking installation in motor vehicles and may be switched on via a first operating switch developed as a reversing switch and via a second operating switch serving as a central switch to which a position switch is assigned which is developed as a two-way switch.

Several versions of such a circuit arrangement are known from the German laid open print 2,854,670. In these embodiments the position switch, at the end of the locking operation, is moved from a first switching position to a second switching position and, at the end of the unlocking operation, from the second switching position back to the first switching position. If, like in one of the embodiments, a further switch were not provided so, if one wished to close a window via the reversing switch, it could only be completely closed in most instances in connection with a locking of the door. Such an embodiment involves the disadvantage that the vehicle can be locked en route which is not desired on grounds of safety. In order not to lock the door, when the window is completely closed, in another version a normally closed switch is inserted between the terminal of the electric motor which is connected to the position switch and a make contact of the reversing switch which is closed, when the window pane is moved and which is opened as soon as the window has reached its closed position. The switch is opened, the circuit of the electric motor is interrupted upon termination of the closing process, so that it becomes more unlikely that the door will be locked. One cannot entirely exclude a locking, because the circuit of the motor is only interrupted, but the motor is not short-circuited.

Eventually by the German laid open print 2,854,670 a further circuit arrangement has been suggested in which the position switch is designed in such a way that it changes over for a short time, when it is actuated, thereby short-circuits the motor and after expiration of a delay time automatically returns to its rest position, in which the motor circuit is closed. When this position switch is actuated at the end of each unlocking of the door and of each closing of the window it is achieved with great reliability that the window is not opened, when the door is unlocked and that the door is not locked, when the window is closed. The design of a position switch which automatically returns to its rest position with a certain delay time after it was actuated is, however, very complicated.

It is the object of the present invention to develop a circuit arrangement including the features of the invention in such a way that the electric motor is controlled with a small amount of circuitry and simply developed switching means in such a way that it is short-circuited after closing of a window and after unlocking of the doors. Of course the mode of operation of the circuit arrangement is not to be disadvantageously affected.

SUMMARY OF THE INVENTION

This problem is solved according to the invention in a circuit arrangement including the features of the invention in such a way that after the window has been closed completely the position switch may be changed over from a first into a second switching position and after the door has been unlocked or before the window is opened the position switch may be changed over from the second to the first switching position and that during a locking process the second input of the position switch may be connected to another pole of the voltage source than during the other adjusting operations. By changing the switching position after the window has been completely closed and after an unlocking operation has been carried out before or the window has been opened just directly after it had been closed, the motor can be short-circuited. In case the door is to be locked after the window has been closed, the second input of the position switch, which in the second switching position is acted upon by the bridging contact of the position switch, is applied to the other pole of the voltage source, so that the motor is supplied with voltage and locks the door.

Advantageous embodiments of the invention can be seen from the subclaims. The change of the poles at the second input of the position switch can according to the invention in a simple manner be effected in that this second input is connected to the output of a further two-way switch in an electrically conductive manner, which two-way switch is changed over from a first switching position into a second switchin position during the locking process. In the first switching position of the further two-way switch it is possible to short-circuit the motor. The short-circuit is suspended by the change-over. The circuit arrangement can be additionally simplified in a particularly advantageous manner in that, when several electric motors and thus several position switches are provided, according to the invention to the second inputs of all position switches only one further two-way switch is assigned. Thus in contrast to the prior art an additional switch is not necessary for each electric motor. A single additional switch for all electric motors is enough. An operation of the two-way switch can be made possible in that its bridging contact is realised as a switch contact of a relay and that this relay may be controlled via the central switch during a locking operation. It is also a particularly simple solution of the problem, when according to the invention the additional two-way switch is directly assigned to the central switch and the former may be manually operated together with the latter. This combined switch can mechanically be laid out without great difficulties in such a way that the two-way switch is only changed over, when the central switch is moved in the direction in which a locking operation is released.

Other embodiments refer to advantageous embodiments of the circuit arrangement according to the invention with regard to how the first input of the position switch and the terminal of the electric motor which is not connected to the position switch can be controlled by means of the reversing switch and of the central switch. Thereby one obtains embodiments by the features according to the invention, in which embodiments the first input of the position switch and the second terminal of the electric motor can be directly connected with the one or other pole of the voltage source. If one wishes to avoid that the motor currents flow through the central switch it is reasonable according to the invention to provide relays, which can be controlled from the central switch. Thus according to the invention the break contact of the reversing switch which is part of the bridging contact which is connected to the lead conducting to the position switch, during a locking and unlocking process is connected to one pole of the voltage source via at least one switch contact controlled by a relay, whereas the break contact is connected to the other pole of the voltage source via the switch contact or the switch contacts, when the central switch occupies its neutral position. According to another feature also the break contact of the other bridging contact of the reversing switch is connected to the positive or negative pole of the voltage source via a switch contact of a relay. Other embodiments eventually refer to how the change of the potential on the break contact of the first bridging contact of the reversing switch can be effected by means of a third relay or by means of the two relays already available.

BRIEF DESCRIPTION OF THE DRAWING

Several embodiments of a circuit arrangement according to the invention are shown in the drawing. The invention will now be described in detail by this drawing, in which.

DETAILED DESCRIPTION

Figure 1:
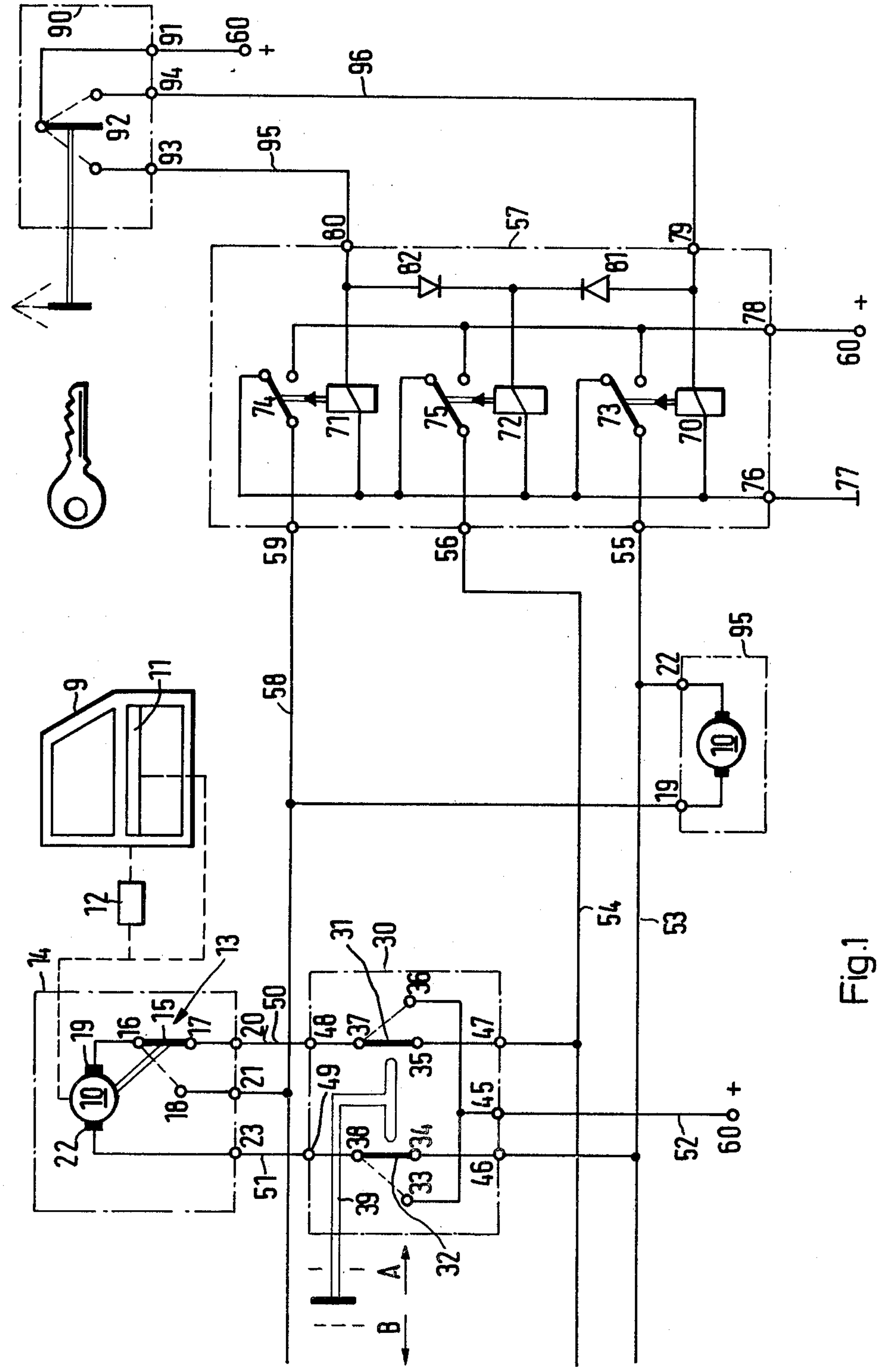
FIG. 1 is a first embodiment, in which the second input of the position switch is connected to the change-over contact of a relay and three relays are used.

In the circuit diagram according to FIG. 1 an electric motor which drives a window 11 is designated by 10, which window is only shown schematically. In addition this electric motor is also used to actuate a door locking element 12. Together with a position switch 13 the motor 10 is included in a motor unit 14. It is assumed that motor units of the same type are arranged in each door 9 of the vehicle.

The position switch 13 has a bridging contact 15 which permanently acts upon the output contact 16 and can be changed over between a first two-way contact 17 and a second two-way contact 18. The output contact 16 is connected to the first terminal 19 of the electric motor 10, the first two-way contact 17 to the output 20 and the second two-way contact to the output 21 of the motor unit 14. The second terminal 22 of the electric motor 10 is connected to the output 23 of the motor unit 14.

To each motor 10 a reversing switch 30 including two movable bridging contacts 31 and 32 and the stationary contacts 33 to 38 is assigned. The first bridging contact 31 is continuously connected to the stationary contact 37 and can be changed over between the stationary contacts 35 and 36. As far as the second bridging contact 32 is concerned the stationary contact 38 corresponds to the stationary contact 37, the stationary contacts 34 and 33 correspond to the stationary contacts 35 and 36. The bridging contacts 31 and 32 can be moved through a handle 39; they are indeed coupled with the handle 39 in such a way that the bridging contact 31, which in the rest position shown interconnects the contacts 35 and 37, is changed over to the contact 36, when the handle 39 is displaced in the direction of arrow A, while the bridging contact 32 remains at rest and continues to interconnect the contacts 34 and 38. When, in contrast thereto, the handle 39 is displaced in the direction of arrow B, only the bridging contact 32 is changed over to the stationary contact 33, while the bridging contact 31 is at rest.

The stationary contacts 33 and 36 are connected to the input 45, the stationary contact 34 is connected to the input 46, the stationary contact 35 to the input 47, the stationary contact 37 to the output 48 and the stationary contact 38 to the output 49 of the reversing switch 30. The output 48 is electrically connected to the input 20 via a lead 50 and the output 49 to the input 23 of the motor unit 14 via a lead 51.

To the input 45 of the reversing switch positive potential 60 is directly conducted via a lead 52. The inputs 46 and 47 of the reversing switch 30 are connected to a collecting main 53 or 54, which start at an output 55 or 56 of a central control device 57. A further collecting main 58 is conducted from an output 59 of the central control device to the input 21 of the motor unit 14. Three relays 70, 71 and 72 are accomodated in the control device 57. Each of these relays includes a switch contact 73, 74 or 75 which is developed as a two-way contact. The switch contact 73 of the second relay 70 is connected to the output 55 of the control device, the switch contact 74 of the first relay to the output 59 and the switch contact 75 of the third relay 72 to the output 56 of said control device. The control device is supplied with ground potential 77 via an input 77 and with positive potential 60 via an input 78. In the rest position of a relay the switch contact of this relay connects the output 55, 56 or 59 assigned to it with the input 76 and in the operating position the assigned output with the input 78. The coils of all relays are on one side connected to the output 76, thus to earth 77. The control device is provided with two further inputs 79 and 80, whereby from the input 79 one lead is directly conducted to the one side of the coil of the relay 70 and from the input 80 a lead is directly conducted to one side of the coil of the relay 71. The one side of the coil of the relay 72 is connected to the input 79 via a diode 81 and to the input 80 via a diode 82. The two inputs 79 and 80 are decoupled from each other by the two diodes.

In addition to the reversing switch 30, which in any case is only assigned to one motor unit 14, a further operating switch 90 is provided, from which all electric motors 10 may be controlled and which therefore has to be regarded as the central switch. This central switch is developed as a two-way push-button switch with neutral position. It has an input 91, via which it is supplied with positive potential and to which the bridging contact 92 is permanently connected. From the neutral position the bridging contact 92 may be connected with the output 93 or with the output 94 of the central switch 90. A lead 95 connects the output 93 of the central switch 90 to the input 80 of the control device 57 and a lead 96 to the output 94 of the central switch to the input 79 of the control device.

In order to illustrate the mode of operation it is started from the conditions shown in the drawing. It is assumed that the window in the vehicle door 9 is partly open, the door is unlocked. The motor 10 is short-circuited. If now the window were to be opened further, the handle 39 of the reversing switch 30 is displaced in the direction of arrow B and thereby the bridging contact 32 is connected to the stationary contact 33. By this measure the motor terminal 22 is supplied with positive potential. The other terminal of the motor 19 is connected to earth via the bridging contact 15 of the position switch 13, the bridging contact 31 of the reversing switch 30, the collecting main 54 and the switch contact 75 of the relay 72. Thus the motor begins to rotate and continues to open the window until the handle 39 is released, so that it and with it the bridging contact 32 can automatically return to the neutral position. Thereby the motor is short-circuited.

If now one wants to close the window negative potential is applied to the terminal 22 of the motor via the bridging contact 32, the collecting main 53 and the switch contact 73 of the relay 70 and the terminal 19 of the motor 10 is applied to positive potential via the bridging contact 15 of the position switch 13 and the bridging contact 31 of the reversing switch 30. Thus the direction of rotation of the motor is reversed and the window is closed. When the handle 39 is released before the window was completely closed the motor is short-circuited via the bridging contact 15, the bridging contact 31, the collecting lead 54 and the switch contact 75. When in contrast thereto the handle 39 is held in a position in which it is displaced in the direction of arrow A, the bridging contact 15 of the position switch changes over from the contact 17 to the contact 18 after the window 11 was completely closed. Thereby the motor is short-circuited via the bridging contact 15, the collecting main 58 and the switch contact 74 of the relay 71, even if the handle 39 retained its position. Thus the motor stops immediately and a locking of the door 9 is avoided.

If now one wants to lock the door the bridging contact 92 of the central switch 90 is connected to the output 93. Thereby a circuit is closed for the relay 71, so that this relay becomes excited and changes over its switch contact 74 and positive potential is conducted from the output 78 to the output 59 of the control device 57, which positive potential is conducted to the terminal 19 of the motor via the collecting main 58 and the bridging contact 15 of the position switch 13, which is connected to the stationary contact 18. Thus the motor can continue to rotate in the same direction as it does, when the window is closed, and thereby lock the door. Thus the control of the motor is made possible by the change-over of the switch contact 74. The switch contact 74 thus represents the additional two-way switch, which during the locking process is changed over from a first switching position into a second switching position.

When a locking process is initiated in addition to the relay 71 also the relay 72 becomes excited via the central switch 90, so that the switch contact of the relay 72 changes over from the position shown into its second position in which it connects the input 78 with the output 56 of the control device 57. This change-over does not exert any influence, when all windows are closed at the beginning of the locking process and thus all bridging contacts 15 of the position switches 13 were changed over to the stationary contacts 18. If, however, one window is still open, the terminal 19 of the motor 10 in question is then at first connected to the positive pole 60 of the voltage source via the switch contact 75 of the relay 72, the bridging contact 31 of the reversing switch 30 and the bridging contact 15 of the position switch 13. When the window is completely closed and the bridging contact 15 changed over from the stationary contact 17 to the stationary contact 18, the terminal 19 of the electric motor 10 continues to be connected to the positive pole 60 via the switch contact 74 of the relay 71. If thus the vehicle is locked by means of the central switch 90 it is ensured that all windows which might perhaps still be open, will be closed thereby.

When the vehicle is to be unlocked, the bridging contact 92 of the central switch 90 is connected to the output 94, so that the relay 70 becomes excited, changes over its switch contact 73 and thus connects the input 78 to the output 55 of the control device. Thus the terminal 22 of the motor 10 is connected to the positive pole 60 via the bridging contact 32 of the reversing switch 30 and the switch contact 73 of the relay 70 and the terminal 19 is connected to earth via the bridging contact 15 of the position switch 13 and the switch contact 74 of the relay 71. In comparison to the direction of rotation during a locking process the motor now rotates in the reverse direction. Upon termination of the unlocking process the bridging contact 15 changes over from the stationary contact 18 to the stationary contact 17. Thus the terminal 19 is connected to the output 56 of the control device 57 via the bridging contacts 15 and 31. This terminal carries positive potential, because the relay 72 became excited also during an unlocking process and the output 56 is therefore supplied with positive potential via the input 78. The motor is therefore short-circuited. An opening of the window pane is avoided. If only a door locking element 12 has to be actuated by a motor 10, as for example in the cases of a bonnet or a luggage compartment cover 95, one does not need a position switch 13. It is sufficient, when the terminal 19 of the motor is connected to the collecting main 58 and the terminal 22 of the motor 10 to the collecting main 53.

Figure 2:
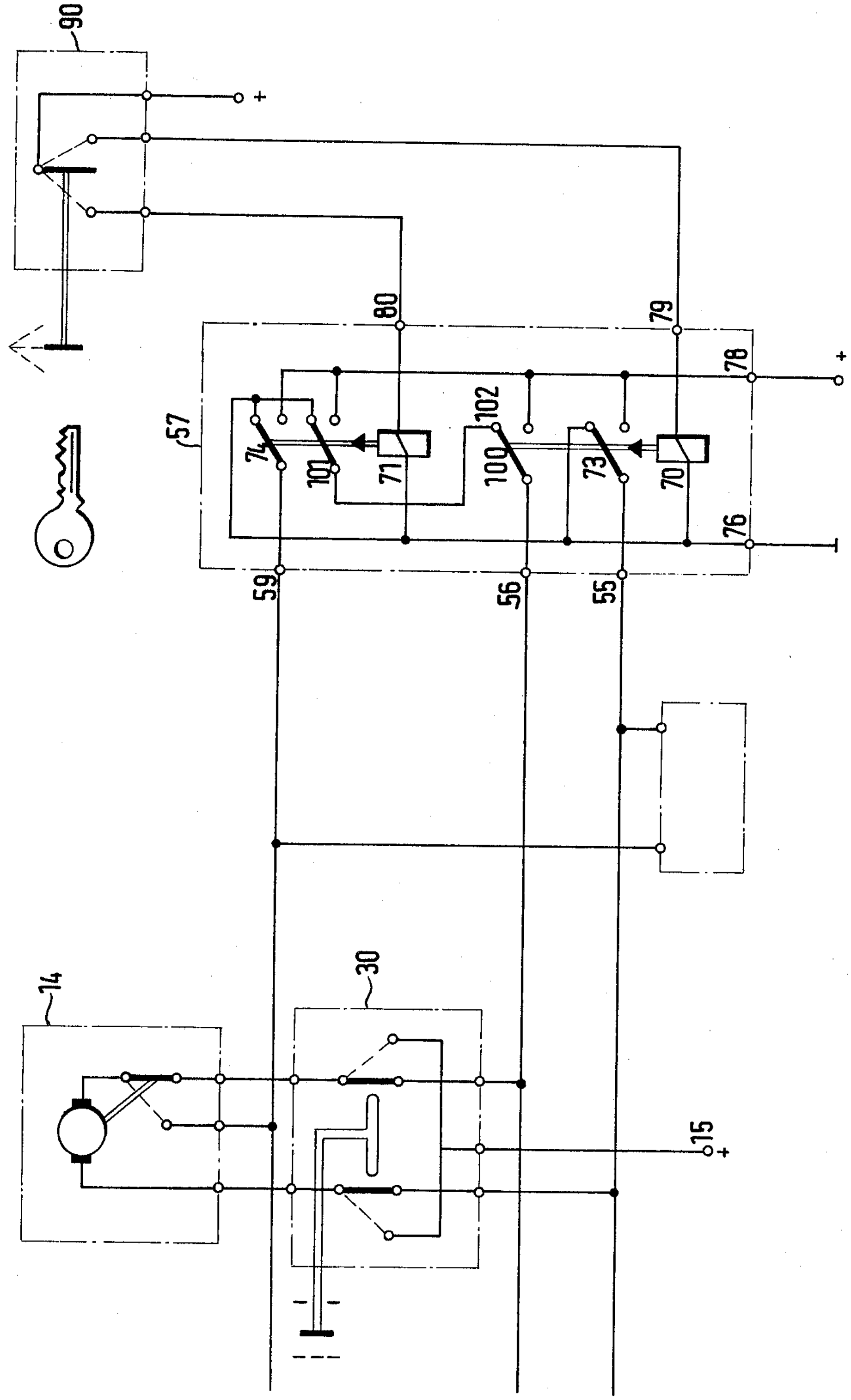
FIG. 2 is an embodiment including only two relays.

In the circuit arrangement according to FIG. 2 the motor unit 14, the reversing switch 30 and the central switch 90 are built up as in the circuit arrangement according to FIG. 1. The control device 57 again has the inputs 76, 78, 79 and 80 and the outputs 55, 56 and 59. The central switch 90, the reversing switch 30 and the motor unit 14 are connected to them in exactly the same way as in the circuit arrangement according to FIG. 1.

A difference to the version of FIG. 1 is only to be seen in the interior construction of the control device 57. For there it is now done without a third relay in addition to the relays 70 and 71. The functions this relay had in the embodiment according to FIG. 1 are now carried out by two additional switch contacts 100 and 101, of which the switch contact 100 is actuated by the relay 70 and the switch contact 101 by the relay 71. The switch contact 100 of the relay 70 is permanently connected to the output 56 and, when the relay is excited, connects this output to the input 78 such as the switch contact 73 connects the output 55 with the input 78. In de-energised condition the switch contact 100 is connected to a stationary contact 102, which is connected to the switch contact 101 of the relay 71 in an electrically conductive manner. Exactly like the switch contact 74 the switch contact 101 of the relay 71 is developed as a two-way contact, which like the switch contact 74 is connected to the input 76, when the relay is de-energised, and to the input 78 of the control device 57, when the relay is energised.

In order to realise that the circuit arrangement according to FIG. 2 makes possible the same control processes as that according to Fig., it has only to be considered, whether in the various types of operation the same potentials appear at the outputs 55, 56 and 59 as in FIG.

1. If the central switch 90 were in the neutral position neither the relay 70 nor the relay 71 would be excited. The output 55 carries earth potential via the switch contact 73, the output 56 via the switch contact 100 and the switch contact 101 and the output 59 via the switch contact 74. During a locking process the relay 71 is energised. The output 55 is not affected thereby, the output 56 is supplied with positive potential via the switch contact 100 and the switch contact 101 just as the output 59 via the switch contact 74. During an unlocking process the relay 70 is excited, so that positive potential is conducted to the output 55 via the switch contact 73 and to the output 56 via the switch contact 100. The output 59 carries groud potential via the switch contact 74. Thus the various conditions at the outputs 55, 56 and 59 correspond to the conditions in question in the version according to FIG. 1. Therefore the circuit arrangement according to FIG. 2 offers the same possibilities of control as the circuit arrangement according to FIG. 1. However one relay can be saved.

Figure 4:
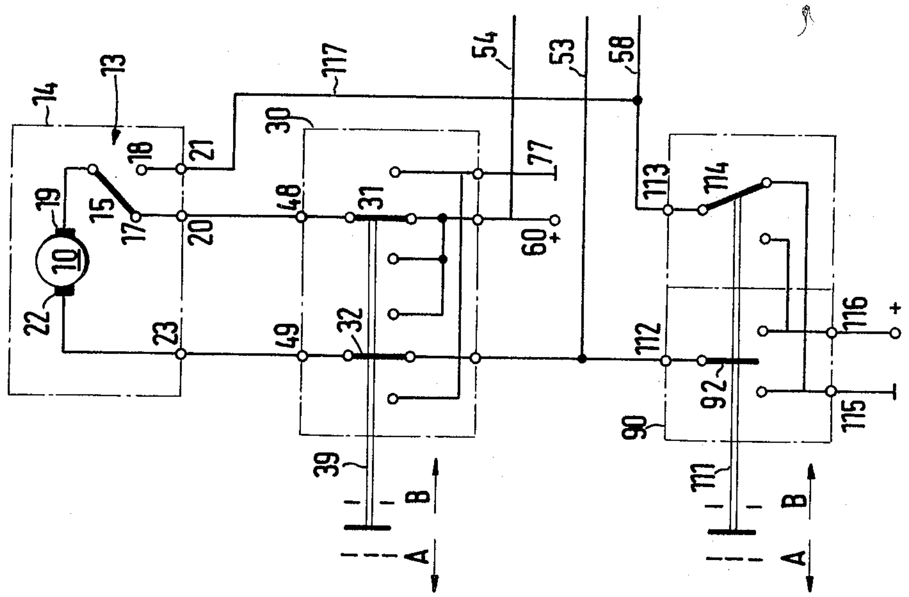
FIG. 4 is an embodiment similar to that of FIG. 3, but with only two bridging contacts in the reversing switch.
Figure 3:
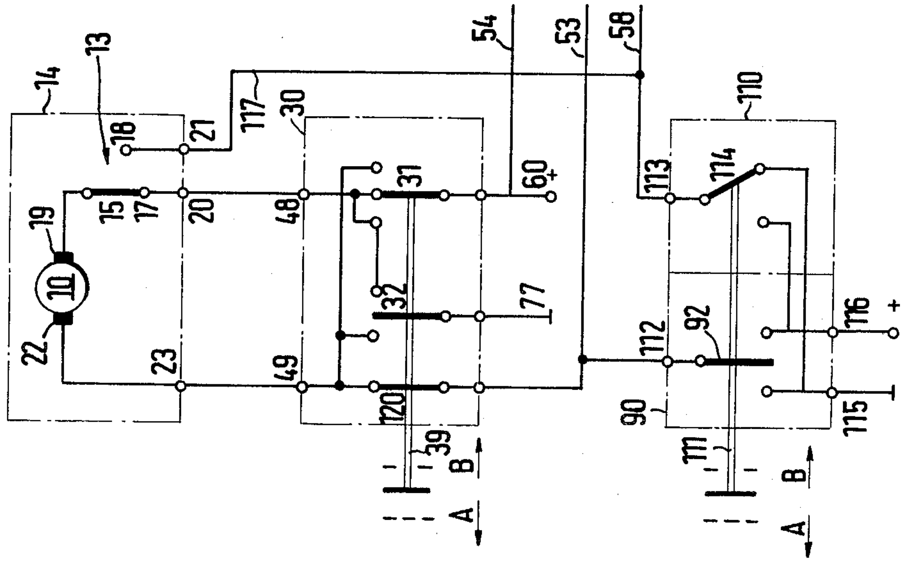
FIG. 3 is a third embodiment, in which the motor currents flow through the central switch during an unlocking and a locking operation, the reversing switch comprises a third bridging contact and the further two-way switch is assigned to the central switch.

In comparison to the versions of FIGS. 1 and 2 the versions according to FIGS. 3 and 4 are simplified by not using relays. But during an unlocking or locking operation the high motor currents now flow through the central switch 90. A switch 110 which is directly assigned to the central switch 90 and can be actuated via the joint handle 11 serves as a further two-way switch. Each of the two switches 90 or 110 has an output 112 or 113. The bridging contact 92 of the central switch 90 may be swivelled from the neutral position to the inputs 115 and 116 of the switch combination, which are connected to different poles of the voltage source. In the neutral position of the bridging contact 92 and in the position in which the bridging contact 92 connects the input 116 with the output 112 the bridging contact 114 is connected to the input 115 and in the other switching position of the bridging contact 92 to the input 116. The collecting main 58 is connected to the output 113 and the collecting main 53 to the output 112.

In the version according to FIG. 3 the reversing switch 30 includes a third bridging contact 120 in addition to the bridging contact 31 and 32, which now are all changed over upon actuation of the handle 39. The bridging contact 31 is permanently connected to the collecting main 54 which carries positive potential 60 and the bridging contact 32 is permanently connected to earth 77. In the rest position of the reversing switch 30 the bridging contact 120 connects the output 49 and thus the terminal 22 of the electric motor 10 with the collecting main 53. The connection between the collecting main 53 and the output 49 is interrupted in any operating position of the reversing switch 30. In the rest position of the reversing switch the bridging contact 31 connects the output 48 with the collecting main 54, whereas the bridging contact 32 occupies a neutral position. When the handle 39 is displaced in the direction of arrow A the output 49 is connected to earth 77 via the bridging contact 32, whereas nothing is changed in the connection between the output 48 and the collecting main 54 via the bridging contact 31. Upon a displacement in the direction of arrow B the bridging contact 32 connects the output 48 to earth 77 and the bridging contact 31 the output 49 to the collecting main 54. Also in this case leads are conducted from the outputs 48 and 49 of the reversing switch 30 to the inputs 20 and 23 of the motor unit 14. The output 21 of the motor unit 14 is connected to the collecting main 58 via a lead 117

Under the conditions shown the bridging contact 15 of the position switch 13 connects the terminal 19 of the electric motor 10 to the input 20 of the motor unit 14; the window is partly open. In order to lift it the handle 39 of the reversing switch is moved in the direction of arrow A, in order to lower it, the handle is moved in the direction of arrow B. In contrast to the versions of FIGS. 1 and 2 in this case the motor is not short-circuited after the actuation of the handle 39 is terminated. The motor is, however, short-circuited again, when the window is entirely closed. For then the bridging contact 15 of the position switch 13 changes over from the input 20 to the input 21 of the motor unit 14, which input 21 is connected to earth via the lead 117, the collecting main 58 and the two-way switch 110. The other terminal 22 of the electric motor 10 is connected to earth via the bridging contact 32 of the reversing switch 30, when this reversing switch is actuated to close the window. For a locking operation the handle 111 of the switches 90 and 110 is moved in the direction of arrow A, so that the terminal 22 of the motor 10 is connected to earth via the bridging contact 120 of the reversing switch 30 and the bridging contact 92 of the central switch 90 and the terminal 19 is supplied with positive potential via the bridging contact 15 of the position switch 13, the lead 117, the collecting main 58 and the bridging contact 114 of the two-way switch 110, which bridging contact is also changed over, when the handle 111 is moved in the direction of arrow A. In the case of an unlocking operation in contrast thereto the output 113 of the two-way switch 110 is connected to earth and the output 112 of the central switch 90 is supplied with positive potential via the bridging contact 92. In this case this bridging contact 92 has been changed over by moving the handle 111 in the direction of arrow B. This displacement of the handle does not affect the electric connection between the output 113 and the input 115 via the bridging contact 114 of the two-way switch 110. When the unlocking operation is terminated the bridging contact 15 of the position switch 13 changes over to the output 20 and thus short-circuits the motor, so that an opening of the window is avoided. When a locking operation is initiated through the central switch 90 and some windows of the vehicle are still open, they are closed thereby.

The version according to FIG. 4 does not include an additional bridging contact in the reversing switch 30 besides the bridging contacts 31 and 32. Just as in the embodiments according to FIGS. 1 and 2 these two bridging contacts are permanently connected to the outputs 48 and 49 of the reversing switch. In the rest position of the reversing switch 30 the bridging contact 32 connects the output 49 to the collecting main 53 and the bridging contact 31 connects the output 48 with the collecting main 54, which is applied to the positive pole 60 of the voltage source. When the handle 39 is moved in the direction of arrow A the output 49 is connected to earth 77 via the bridging contact 32, while nothing is changed in the connection between the output 48 and the collecting main 54 via the bridging contact 31. When the handle 39 is displaced into the opposite direction the bridging contact 32 connects the output 49 with the collecting main 54 and the bridging contact 31 the output 48 to earth 77. Just as in the embodiment according to FIG. 3 the inputs 20, 21, and 23 of the motor unit 14 are connected to the output 48 of the reversing switch, to the collecting main 58 and to the output 49 of the reversing switch.

When the position of the window is to be changed the electric motor 10, polarised in the one or in the other direction, is connected to the terminals 60 and 77 of the voltage source via the bridging contact 15 of the position switch 13 and via the bridging contacts 31 and 32 of the reversing switch 30. A short-circuit is created via the bridging contact 15 of the position switch 13, the lead 117, the collecting main 58 and the bridging contact 114 of the two-way switch 110, when the window is entirely closed. During a locking operation, when the window has not yet been entirely closed the one side 19 of the electric motor 10 is at first connected to positive potential via the bridging contacts 15 and 31 and then, when it is entirely closed, via the bridging contacts 15 and 114.

During an unlocking operation the terminal 19 is connected to earth via the two last mentioned bridging contacts. Depending on which process is to be initiated the other terminal 22 of the electric motor 10 is connected to the positive or negative terminal of the voltage source via the bridging contacts 32.

We claim:

1. A control circuit for a combined motor-driven window lifter and door locking system having a plurality of reversible motors each of which are respectively assigned to a door having window lifter and door locking devices therein and wherein continued rotation of said motors past their window closed positions results in a door locking operation, said control circuit comprising:

a plurality of position switches (13) respectively coupled to each of said motors, each of said switches having a movable contact (15) connected to one terminal (19) of its associated motor and which is actuated by its associated motor (10) from a first contact (17) at a first switch position corresponding to the unlocked door and window open positions of said motor in a first rotational direction to a second contact (18) at a second switch position corresponding to the window closed end position of said motor (10) in the opposite rotational direction;

a plurality of reversing switches (30) respectively coupled to the terminals of each of said motors through said first contact (17) of said position switches (13) for reversing the polarity of the voltage source applied to the terminals of its associated motor (10), thereby to open or close the window;

a central switch (90) having door locking and door unlocking switch positions; and, means responsive to said central switch (90) for selectively applying one pole (60) of said voltage source to said second contact (18) of said motors or to the terminal (22) of said motors other than said one terminal thereby to respectively lock or unlock said door locking device.

2. The control circuit according to claim 1, including means for applying one pole (60) of said voltage source to said first contact (17) when said movable contact (15) is in said first switch position and while said means responsive to said central switch (90) is applying said one pole (60) of said voltage source to said second contact (18), whereby all open windows are moved toward their closed positions during a door locking operation.

3. The control circuit according to claim 2, including means for short-circuiting said motors when said movable contact (15) is in said first position and while said means responsive to said central switch (90) is applying said one pole (60) of said voltage source to said terminal (22) of said motors other than said one terminal, whereby all windows remain closed during a door unlocking operation.

4. The control circuit according to claim 3, wherein said means for short-circuiting includes means for applying said one pole (60) of said voltage source to said first contact (17).

5. The control circuit according to claim 1, including means for short-circuiting said motors when said movable contact (15) is in said first position and while said means responsive to said central switch (90) is applying said one pole (60) of said voltage source to said terminal (22) of said motors other than said one terminal, whereby all windows remain closed during a door unlocking operation.

6. The control circuit according to claim 1, wherein said means responsive to said central switch (90) normally applies the other pole (77) of said voltage source to said second contact (18) until said one pole (60) of said voltage source is selectively applied to said second contact (18).

7. The control circuit according to claim 6, wherein said means responsive to said central switch (90) includes a first relay (71) and a second relay (70);

said first relay (71) having an energizing coil coupled to a door locking contact of said central switch (90) and said first relay (71) having a movable contact coupled to said second contact (18), a normally open contact coupled to said one pole (60) and a normally closed contact coupled to the other pole (77) of said voltage source; and, said second relay (70) having an energizing coil coupled to a door unlocking contact of said central switch (90), said second relay (70) having a movable contact coupled to said terminal (22) of said motors other than said one terminal, a normally open contact coupled to said one pole (60) and a normally closed contact coupled to the other pole (77) of said voltage source.

8. The control circuit according to claim 7, wherein said means responsive to said central switch (90) further includes a third relay (72) having an energizing coil coupled through an isolation circuit (81, 82) to said contacts of said central switch (90), said third relay having a movable contact coupled to said first contact (17), a normally open contact coupled to said one pole (60) and a normally closed contact coupled to the other pole (77) of said voltage source.

* * * * *